(12) United States Patent
Berggren et al.

(10) Patent No.: US 8,798,800 B2
(45) Date of Patent: Aug. 5, 2014

(54) CONTROL OF A POWER TRANSMISSION SYSTEM

(75) Inventors: Bertil Berggren, Vasteras (SE); Petr Korba, Turgi (CH); Rajat Majumder, Vasteras (SE); Swakshar Ray, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/323,432

(22) Filed: Dec. 12, 2011
(Under 37 CFR 1.47)

(65) Prior Publication Data
US 2013/0054035 A1 Feb. 28, 2013

Related U.S. Application Data

(63) Continuation of application No. PCT/EP2009/057248, filed on Jun. 11, 2009.

(51) Int. Cl.
| | | |
|---|---|---|
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |

(52) U.S. Cl.
USPC .......... 700/286; 700/291; 700/292; 700/295; 700/297

(58) Field of Classification Search
USPC .......................... 700/286, 291, 292, 295, 297
See application file for complete search history.

(56) References Cited

U.S. PATENT DOCUMENTS

| | | | |
|---|---|---|---|
| 8,401,710 B2 * | 3/2013 | Budhraja et al. | 700/291 |
| 2004/0186671 A1 * | 9/2004 | Golder et al. | 702/60 |
| 2009/0099798 A1 | 4/2009 | Gong et al. | |
| 2009/0200872 A1 * | 8/2009 | Johansson | 307/102 |
| 2011/0093124 A1 * | 4/2011 | Berggren et al. | 700/286 |
| 2012/0278015 A1 * | 11/2012 | Budhraja et al. | 702/62 |

FOREIGN PATENT DOCUMENTS

| | | | |
|---|---|---|---|
| EP | 1416603 A1 | 5/2004 | |
| EP | 1780858 A1 | 5/2007 | |
| EP | 1830447 A1 | 9/2007 | |

OTHER PUBLICATIONS

Sadikovic, et al.; "Application of FACTS Devices for Damping of Power System Oscillations"; proceedings of the Power Tech conference 2005, Jun. 27-30; pp. 1-6.

(Continued)

*Primary Examiner* — Ronald Hartman, Jr.
(74) *Attorney, Agent, or Firm* — St. Onge Steward Johnston & Reens LLC

(57) ABSTRACT

The invention provides improved control of a power transmission system having a first group of measurement units in a first geographical area providing a first set of phasors and a second group of measurement units in a second geographical area providing a second set of phasors, where the phasors in the sets are generated at the same instant in time. In this system the power control device includes a phasor aligning unit that time aligns the first and second sets of phasors and a control unit that compares each set of phasors with a corresponding phasor number threshold, determines that a first control condition is fulfilled if each phasor number threshold has been exceeded and enables the provision of a common signal if the first control condition is fulfilled. The common signal is based on the obtained phasors in the first and second sets.

26 Claims, 8 Drawing Sheets

(56) References Cited

OTHER PUBLICATIONS

Kaba, et al.; "Enhanced Transmission Utilization with an Integrated Measurement, Protection, and Control System"; Power System Technology; Dec. 4, 2000; pp. 837-842.

International Preliminary Report on Patentability; Application No. PCT/EP2009/057248; Issued: Sep. 27, 2011; 14 pages.
International Search Report and Written Opinion of the International Searching Authority; Application No. PCT/EP2009/057248; Issued: Apr. 20, 2010; Date of Mailing: May 3, 2010; 10 pages.

* cited by examiner

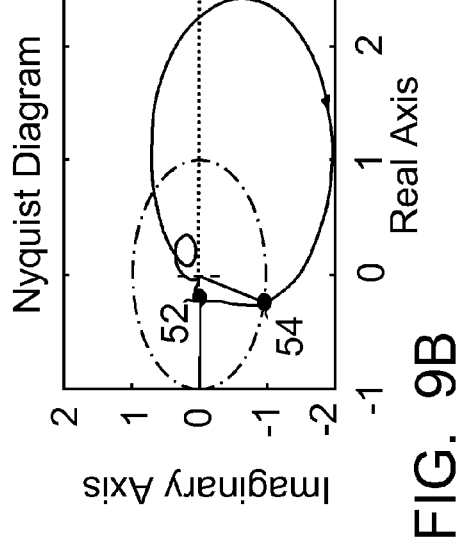
FIG. 9A
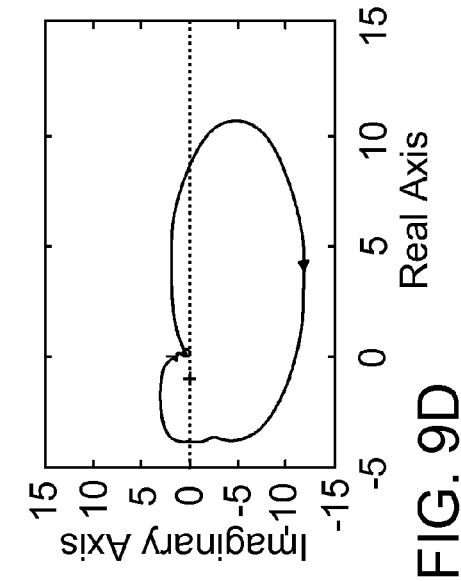
FIG. 9B
FIG. 9C
FIG. 9D
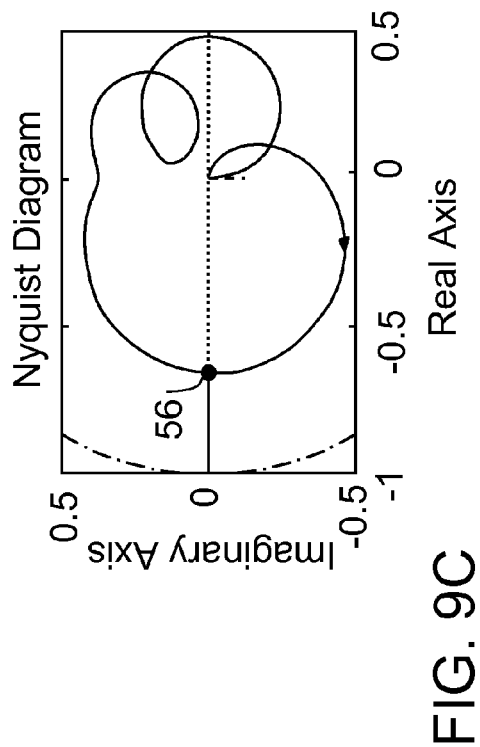

CONTROL OF A POWER TRANSMISSION SYSTEM

CROSS-REFERENCE TO RELATED APPLICATIONS

The present Application is a continuation of pending International Patent Application PCT/EP2009/057248 filed on Jun. 11, 2009 which designates the United States and the content of which is incorporated herein by reference.

FIELD OF THE INVENTION

The invention relates to the field of power oscillations damping in electric power transmission systems. The invention more particularly concerns a method, power control device and computer program product for providing improved control of a power transmission system.

BACKGROUND OF THE INVENTION

In the wake of the ongoing deregulations of the electric power markets, load transmission and wheeling of power from distant generators to local consumers has become common practice. As a consequence of the competition between power producing companies and the emerging need to optimize assets, increased amounts of electric power are transmitted through the existing networks, frequently causing congestions due to transmission bottlenecks. Transmission bottlenecks are typically handled by introducing transfer limits on transmission interfaces. This improves system security.

However it also implies that more costly power production has to be connected while less costly production is disconnected from a power grid. Thus, transmission bottlenecks have a substantial cost to the society. If transfer limits are not respected, system security is degraded which may imply disconnection of a large number of customers or even complete blackouts in the event of credible contingencies.

The underlying physical cause of transmission bottlenecks is often related to the dynamics of the power system. A number of dynamic phenomena need to be avoided in order to certify sufficiently secure system operation, such as loss of synchronism, voltage collapse and growing electromechanical oscillations. In this regard, electrical power transmission systems are highly dynamic and require control and feedback to improve performance and increase transfer limits.

With particular reference to unwanted electromechanical oscillations that occur in parts of the power network, they generally have a frequency of less than a few Hz and are considered acceptable as long as they decay fast enough. They are initiated by e.g. normal changes in the system load or switching events in the network possibly following faults, and they are a characteristic of any power system. The above mentioned oscillations are also often called Inter-area modes of oscillation since they are typically caused by a group of machines in one geographical area of the system swinging against a group of machines in another geographical area of the system. Insufficiently damped oscillations may occur when the operating point of the power system is changed, for example, due to a new distribution of power flows following a connection or disconnection of generators, loads and/or transmission lines. In these cases, an increase in the transmitted power of a few MW may make the difference between stable oscillations and unstable oscillations which have the potential to cause a system collapse or result in loss of synchronism, loss of interconnections and ultimately the inability to supply electric power to the customer. Appropriate monitoring and control of the power transmission system can help a network operator to accurately assess power transmission system states and avoid a total blackout by taking appropriate actions such as the connection of specially designed oscillation damping equipment.

There is thus a need for damping such interarea mode oscillations. The conventional way to perform Power Oscillation Damping (POD) is by adding a modulation signal to the control signal of an actuator which counteracts the power oscillation. Typical actuators which could perform POD include synchronous generators, HVDC and FACTS installations. The control system of the actuator is typically implemented in a real-time environment where time delays are small and deterministic. The modulation signal is typically derived from measurements available locally in the substation in which the actuator is installed. The local signals typically include voltage, frequency, line currents and power flows. However, the observability of the inter-area modes of interest may not be sufficiently good in locally available signals. It has therefore been proposed in literature to collect phasors, such as voltage or current phasors, from the different geographical areas. Here two bus voltages, one from each area, may be used. The motivation for this choice would be that these two voltages implement characteristics of two equivalent machines, where each machine represents one of these coherent groups of machines, i.e. one of the geographical areas of the system. In order to dampen the oscillations, phasors from the different geographical areas are therefore collected, for instance using Phasor Measurement Units (PMUs). A PMU typically takes a number of samples, within a specified time interval, from voltage and/or current measurement transformers and calculates positive sequence phasors corresponding to the measurements. The phasors are then time stamped according to an accurate common time reference frame, typically provided through use of the GPS system. The phasors can typically be made available outside the PMU through a communication network using a standard protocol.

However, in order to apply a proper corrective action, the phasors from the two geographical areas need to be aligned in time. This means that a control mechanism needs to operate on phasors that are aligned in time with each other, i.e. have the same time of generation.

Because of this it is common to provide a Phasor Data Concentrator (PDC), which synchronizes the phasors, i.e. packages the phasors with the same time stamp and sends them on to a power control device that performs the damping control.

However, there are a number of problems associated with the above-described damping scheme. The coherent groups are often not very well-defined, in particular when considering that some machines may be out of service at a given point in time, and therefore a selected bus voltage may not be a good representation of a geographical area.

The phase angle of bus voltages may also jump as a consequence of switching events in the vicinity of the bus, contrary to internal machine angles which are associated with inertial (time) constants. A given voltage that is selected to represent a part of the system in a geographical area may therefore be unreliable also because of this.

Furthermore, if one measurement experiences too long a time delay before it is received at a control system of an actuator or is completely lost, the performance of the power oscillation damping algorithm will deteriorate and may even worsen the situation, at least temporarily until data starts to arrive in a timely fashion again.

SUMMARY OF THE INVENTION

There is therefore a need for addressing some or all of these problems.

It is therefore an objective of the invention to increase the robustness and reliability of the power oscillations damping control performed in a power transmission system. These objectives are achieved by a method and a power control device and a computer program product. Further preferred embodiments are evident.

According to a first aspect of the invention, a method is provided for providing improved control of a power transmission system having a first group of measurement units in a first geographical area and providing a first set of on-line measured phasors and a second group of measurement units in a second geographical area and providing a second set of on-line measured phasors, where the first and second groups of measurement units each include at least two measurement units and the phasors in the first and second sets are generated at the same instant in time, the method comprising the steps of:

obtaining the first set of phasors from the first group of measurement units and the second set of phasors from the second group of measurement units, aligning the first and second sets of phasors with each other in time, comparing each set of phasors with a corresponding phasor number threshold, determining that a first control condition is fulfilled if each such phasor number threshold has been exceeded, and enabling the provision of a common signal if at least the first control condition is fulfilled, where this common signal is based on the obtained phasors in the first and second sets and provided for use in inter-area oscillations damping in relation to the first and the second geographical areas.

According to a second aspect of the present invention a power control device for providing improved control of a power transmission system is provided. The system has a first group of measurement units in a first geographical area providing a first set of on-line measured phasors and a second group of measurement units in a second geographical area providing a second set of on-line measured phasors, where the first and second groups of measurement units each include at least two measurement units and the phasors in the first and second sets are generated at the same instant in time. The power control device includes a phasor aligning unit that aligns the first and second sets of phasors with each other in time and a control unit that compares each set of phasors with a corresponding phasor number threshold, determines that a first control condition is fulfilled if each such phasor number threshold has been exceeded and enables the provision of a common signal if at least the first control condition is fulfilled, where this common signal is based on the obtained phasors in the first and second sets and provided for use in inter-area oscillation damping in relation to the first and the second geographical areas.

According to a third aspect of the present invention there is provided a computer program for providing improved control of a power transmission system, where the system has a first group of measurement units in a first geographical area providing a first set of on-line measured phasors and a second group of measurement units in a second geographical area providing a second set of on-line measured phasors, where the first and the second groups of measurement units each include at least two measurement units and the phasors in the first and second sets are generated at the same instant in time. The computer program is loadable into an internal memory of a power control device and comprises computer program code means to make the power control device, when the program is loaded in the internal memory, obtain the first set of phasors from the first group of measurement units and the second set of phasors from the second group of measurement units, align the first and second sets of phasors with each other in time, compare each set of phasors with a corresponding phasor number threshold, determine that a first control condition is fulfilled if each such phasor number threshold has been exceeded, and enables the provision of a common signal based on the obtained phasors in the first and second sets if at least the first control condition is fulfilled. The common signal is provided for use in inter-area oscillation damping in relation to the first and the second geographical areas.

The aligning of the phasors in time may be implemented in a real time environment and the same time reference as used in the measurement units (e.g. by using GPS) is made available in the real time environment such that the time delay can be estimated at each time instance in the alignment process.

The invention according to these aspects has the advantage of enabling a more robust and reliable power oscillations damping to be made in that damping is not solely relying on single values in the two geographical areas.

In one variation of the invention the provision of a common signal may be enabled as soon as the first control condition is fulfilled.

In another variation a second control condition may be determined to be fulfilled when a comparison of the time difference between the time of generation of the phasors in the sets with a current time equals a delay time limit. The provision of the common signal may here be enabled as soon as the first and second control conditions are fulfilled.

It is also possible to compare the time difference between the time of generation of the phasors in the sets with a current time and disable the provision of the common signal if this time difference equals a maximum delay time limit.

According to another variation of the invention, the common signal is provided through forming at least one difference signal based on phasor data originating in the phasors of the first and second sets, and combining phasor data originating in phasors of the first set and phasors of the second set.

According to another variation the combining involves providing a weighted average of the phasor data.

According to another variation the combing comprises combining phasor data from the phasors in the first set for forming a first combined signal and combining phasor data from phasors in the second set for forming a second combined signal and the forming of at least one difference signal comprises forming a difference signal based on the first and second combined signals, where the common signal is the difference signal.

According to another variation the forming of at least one difference signal comprises forming difference signals between the phasors of the first and second sets and the combing comprises combining the difference signals.

According to a further variation the phases of phasor data are adjusted to a reference phase. Phasor data may here be phasor data in each set of phasors or phasor data in difference phasors between two different sets of phasors.

The measurement units in two groups may together form a number of phasor source combinations. Each phasor source combination may be associated with a corresponding location combination and each location combination may include one location in the first geographical area and one location in the second geographical area, where the measurement units in the first and second groups may placed at locations identified by selected location combinations, the location combinations being selected through pre-performed residue analyses made on difference phasors having residue magnitudes above a residue magnitude threshold, where each of these difference phasors has been obtained as the difference between a pair of off-line measured phasors originating at a corresponding location combination. The location combinations may have been selected through a pre-performed residue analysis performed on measured phasors according to an available system model that is available a-priori.

Additionally a difference phasor for which the corresponding residue analysis has the highest magnitude may be denoted a main difference phasor. The location combination associated with this main difference phasor may be assigned the reference phase. Each phase difference that exists between the main difference phasor and other difference phasors associated with corresponding selected location combinations may have been assigned to the corresponding location combination for allowing adjusting of the phases of the difference signals for phasor source combinations to be made according to the phase difference assigned to the corresponding location combination. This principle may also be applied to phasor sources for each geographical area and their locations in this area.

Furthermore, a time delay of the common signal may be determined. The time delay may then be converted into a phase shift of the frequency of an oscillatory mode to be damped, four compensation angles calculated from the phase shift, a Nyquist diagram of each compensation angle constructed, a preferred compensation angle determined through analysis of the four Nyquist diagrams and the preferred compensation angle applied to the common signal.

Preferably, the invention may further comprise constructing a Bode diagram of at least two of the four compensation angles, and determining of a preferred compensation angle through analysis of the Bode diagrams specifically, evaluating decay of gain at higher frequencies.

The invention may also comprise constructing a complex frequency domain diagram of at least two of the four compensation angles, determining a preferred compensation angle through analysis of the complex frequency domain diagram, and specifically, evaluating eigenvalue shift with respect to other system eigenvalues. The converting of the time delay into a phase shift may further occur at the dominant frequency.

The four compensation angles may be a lead compensation to +1 and a lag compensation to −1 and a lead compensation to −1 and a lag compensation to +1 of the phase shift signal.

It is further possible that the differences in phase between the main difference phasor and the other differences phasors associated with selected location combinations is less than one-hundred and eighty degrees.

If, according to another variation, one phasor in one set of on-line measured phasors is not received or delayed by more than a maximum delay, then this phasor and the corresponding phasor source combination is omitted from the forming and combining of difference signals.

BRIEF DESCRIPTION OF THE DRAWINGS

The subject matter of the invention will be explained in more detail in the following text with reference to preferred exemplary embodiments which are illustrated in the attached drawings, of which:

FIG. 9A-9D show Nyquist diagrams of the four possible solutions.

DETAILED DESCRIPTION OF THE INVENTION

Figure 1:
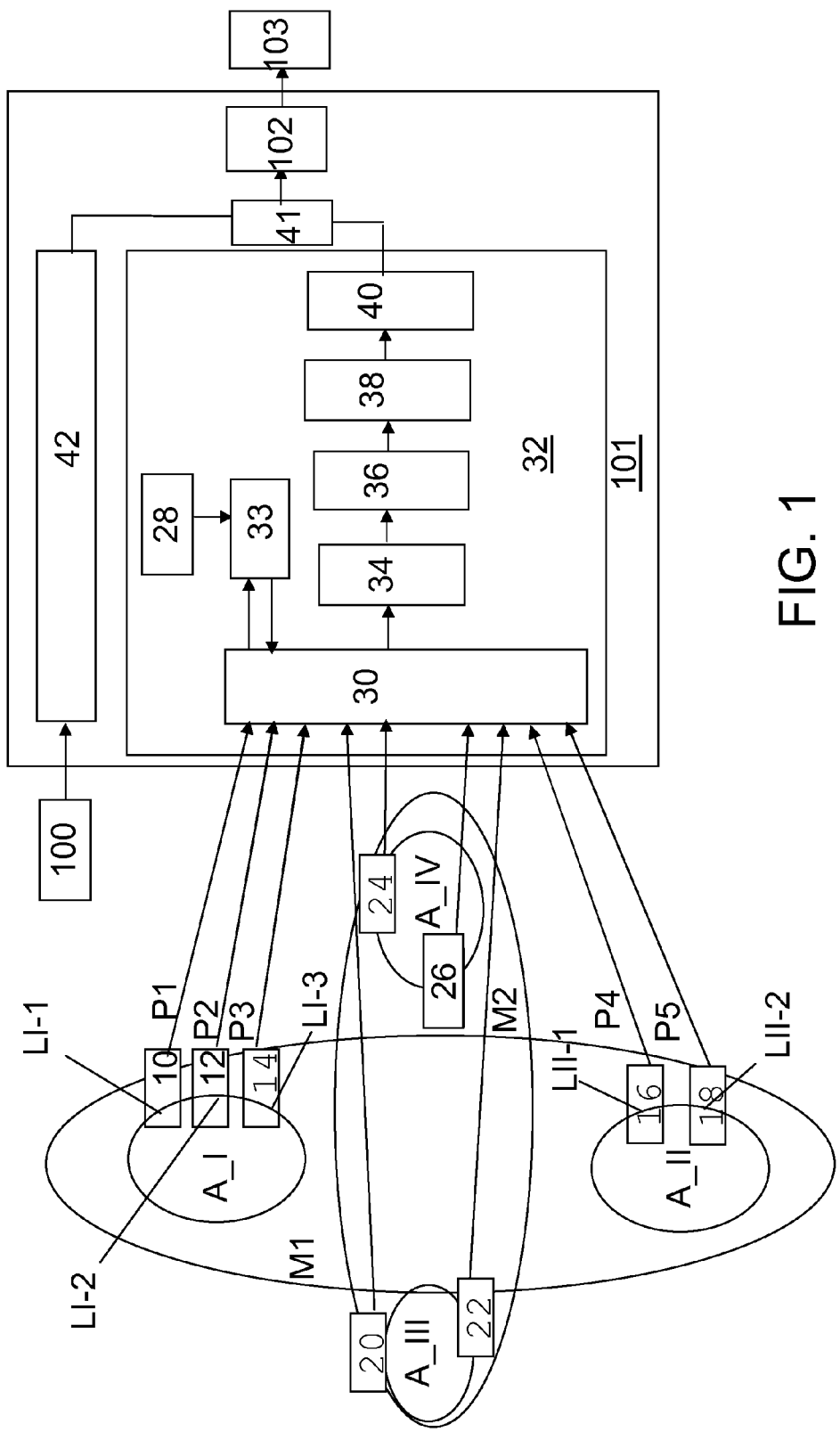
FIG. 1 schematically shows four geographical areas of a power transmissions system together with a power control device according to a first embodiment of the invention, FIG. 2 schematically shows a first and second geographical area in the power transmission system of FIG. 1, FIG. 3 schematically shows a flow chart outlining a number of method steps being performed in a method according to the first embodiment of the invention, FIG. 4 schematically shows a combining unit used in the power control device of the present invention, FIG. 5 schematically shows a number of units in a variation of a power control device, FIG. 6 schematically shows a power transmission system including a power control device according to a second embodiment of the invention, FIG. 7 schematically shows a power transmission system including a power control device according to a third embodiment of the invention, FIG. 8A graphically illustrates a pole-shift in the complex frequency domain of a power oscillations damping unit, FIG. 8B graphically illustrates the delayed measured signal and four possible solutions (A, B, C and D) for the compensation of the time delay.

FIG. 1 schematically shows a power transmissions system in which a power control device 32 according to a first embodiment of the invention is provided. The power transmission system is preferably an AC power transmission system and then operating at a network frequency such as 50 or 60 Hz.

The power transmission system includes a number of geographical areas, which are here four areas A_I, A_II, A_III and A_IV. These areas are typically provided on great distances from each other, where one may as an example be provided in the south of Finland and another in the south of Norway. A geographical area is here a coherent area. A coherent area is an area where a group of electrical machines, such as synchronous generators, are moving coherently, i.e. they are oscillating together. Such an area may also be considered as an electrical area, because the machines are close to each other in an electrical sense. In these geographical areas there are high-voltage tie lines for connecting geographically separated regions, medium-voltage lines, substations for transforming voltages and switching connections between lines as well as various buses in the local areas. Measurement units are furthermore connected to such power lines and buses. The measurement unit may here be connected to a Phasor Measurement Unit (PMU). A PMU provides time-stamped local information about the system, in particular currents and voltage phasors. A plurality of phasor measurements collected throughout the network by PMUs and processed centrally can therefore provide a snapshot of the overall electrical state of the power transmission system. Such PMUs are normally also equipped with GPS synchronized clocks and will send phasors, such as positive sequence phasors, at equidistant points in time, e.g. every 20 ms. These phasors are thus time stamped with high accuracy, and the time stamp may represent the point in time when the phasor was measured in the system. The phasors could be time stamped, i.e. receive time indicators, using Assisted GPS (A-GPS).

In FIG. 1 there is a first group of measurement units in the first geographical area A_I, a second group of measurement units in the second geographical area A_II, a third group of measurement units in the third geographical area A_III and a fourth group of measurement units in the fourth geographical area A_IV. In the first group there are three measurement units 10, 12 and 14. In the second group there are two measurement units 16 and 18. In the third group there are two measurement units 20 and 22 and in the fourth group there are also two measurement units 24 and 26. These measurement units are in this example all PMUs that measure phasors, time stamps the phasors and sends these in order for these phasors to be processed by a power control device 32. It should here be realized that there may be many more different measurement units in the different geographical areas. There can furthermore also be more measurement units in each group. These geographical areas each correspond to a separate group of machines swinging against a group of machines of another geographical area.

Here each group of measurement units includes at least two measurement units and they together form a number of phasor source combinations. A measurement unit in the first geographical area therefore forms a phasor source combination with a measurement unit in the second geographical area. In a similar manner a measurement unit in the third geographical area forms a phasor source combination with a measurement unit in the fourth geographical area. Each phasor source combination is furthermore associated with a corresponding location combination. Each location combination includes one location in one geographical areas and another location in a corresponding geographical area. Here the first geographical area is linked in this way to the second geographical area and the third geographical area to the fourth geographical area.

In FIG. 1 a first measurement unit 10 at a first location LI-1 in the first geographical area A_I is shown as sending a first phasor P1, typically a voltage phasor, a second measurement unit 12 at a second location LI-2 in the first geographical area A_I is shown as sending a second phasor P2, a third measurement unit 14 at a third location LI-3 in the first geographical area A_I is shown as sending a third phasor P3, a fourth measurement unit 16 at a first location LII-1 in the second geographical area A_II is shown as sending a fourth phasor P4 and a fifth measurement unit 18 at a second location LII-2 in the second geographical area A_II is shown as sending a fifth phasor P5. The first, second and third phasors P1, P2 and P3 are here a first set of on-line measured phasors while the fourth and fifth phasors P4 and P5 are a second set of on-line measured phasors. This means that these phasors preferably are measured whenever the power control device and more particularly when a power oscillations damping function of the power control device is running. It should here be realized that also the other measurement units in FIG. 1 send phasors to be processed by the power control device 32. However, these phasors are here omitted in order to provide a clearer description of the present invention. All these phasors are thus measured on-line and provided for the power control device.

The phasors are thus obtained at distant geographical locations and time stamped by the measurement units, normally using a GPS clock and sent via communication channels, which are potentially several thousand kilometers in length, to the power control device 32.

The power control device 32 may be a part of a general power control system 101 provided for an actuator 103, which may be a synchronous generator or a FACTS or HVDC installation. The general power control system 101 here includes an actuator control unit 102 which provides an actuator control signal for the actuator 103. In this regard the power control device 32 according to this first embodiment provides a modulation signal that is added to the actuator control signal generated by the actuator control unit 102 in order to counteract power oscillations. This modulation signal is here simply termed control signal.

The power control device 32 according to this first embodiment includes a phasor aligning unit 30, which may be a Phasor Data Concentrator (PDC) 30. This phasor aligning unit 30 receives the above-described phasors and synchronizes them, i.e. packages the phasors with the same time stamp. The phasor aligning unit 30 is also connected to a GPS clock 28, which may an A-GPS clock, for the purpose of establishing the time delay in the alignment process. This clock is according to this first embodiment also included in the power control device 32.

The normal operation of a phasor aligning unit 30 is to listen to measurement units that are sending time stamped phasors on a regular basis (e.g. every 20 ms). The phasor aligning unit 30 aligns the phasors according to the time stamp, expecting one phasor from each measurement unit per time slot, and forward all phasors when these corresponding to a given time slot are available. If one phasor is late in arriving, the phasor aligning unit 30 waits till it arrives, thus introducing a time delay. While such a phasor aligning unit is waiting for a late arriving phasor from one measurement unit, the phasors from the other measurement units will be stored on stack and processed in due time.

According to the first embodiment of the invention the power control device 32 includes a difference forming unit 34 that is connected to the phasor aligning unit 30. A phase adjusting unit 36 is in turn connected to the difference forming unit 34, while a combining unit 38 is connected to the phase adjusting unit 36. There is also a wide area power oscillations damping unit 40 connected to the combining unit 38. The wide area power oscillations damping unit 40 may generate a control signal applied to a control system for damping inter-area power oscillations, which oscillations in the first mode are inter-area oscillations between the first and the second geographical areas A_I and A_II, indicated by M1. There can also be second mode inter-area oscillations between the third and the fourth geographical areas A_III and A_IV, indicated by M2. How such damping may be performed is as such known in the art and will not be described in more detail here. In the power control device there is furthermore a control unit 33 controlling when the phasor aligning unit 30 is to deliver phasors to the difference forming unit 14. In the general power control system 101 there is also provided a switchover unit 41 and a local power oscillations damping unit 42. The local power oscillations damping unit 42 is here provided in parallel with the power control device 32. This local power oscillations damping unit 42 receives local measurements 100 and provides a modulation signal determined based on these local measurements 100, which modulation signal can be added to the control signal generated by the actuator control unit 102. Both the wide area power oscillations damping unit 40 and the local power oscillations damping unit 42 are connected to the switchover unit 41, which passes on signals from either of these two units 40 and 42 to the actuator control unit 102 for performing power oscillations damping.

The operation of the actuator 32 according to this first embodiment of the invention will now be described in relation to a first and a second set of phasors that are being collected by the first group of measurement units and the second group of measurement units, respectively. For the sake of simplifying the description of the present invention, the operation in relation to the third and fourth geographical area will not be described, but only operation in relation to the first and second geographical areas, i.e. in relation to the first mode M1.

Operation in relation to mode M2 is similar to operation in relation to mode M1. Furthermore, the first set of phasors P1, P2 and P3 here only includes phasors that have been collected by the first group of measurement units 10, 12 and 14 which are time stamped using a GPS clock. The second set of phasors P4 and P5 have been collected by the second group of measurement units 16 and 18 and time stamped as the first set. This means that both sets of phasors have been time stamped using a GPS clock. However these two sets of measurements could use fully or partially same set of satellites or completely different set of satellites. The phasors may here represent amplitude and phase of a voltage or current.

Figure 2:
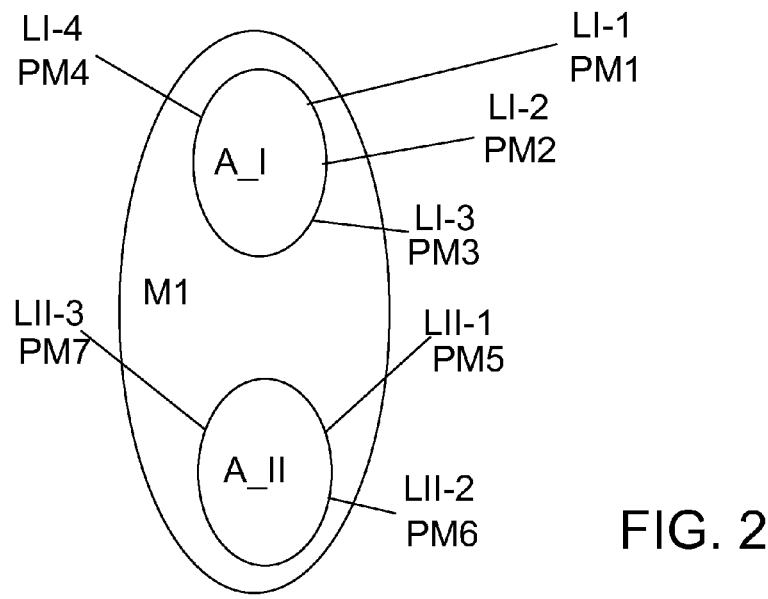

The placement of measurement units and the forming of phasor source combinations and location combinations may in one variation of the invention be made randomly in the two geographical areas. According to another variation of the invention the placement of the first and second groups of measurement units may be deliberate according to a placing scheme in the two areas A_I and A_II. In this regard the measurement units in the first group may have a special relationship to the measurement units in the second group. The measurement units in the first and second groups each form phasor source combinations and may be placed at locations identified by selected location combinations. How this can be done will now be described with reference being made to FIG. 2, which schematically shows a number of locations in the first and second geographical areas at which off-line measurements have been made. The location combinations have in this variation of the invention been selected through pre-performed residue analyses made on difference phasors having residue magnitudes above a residue magnitude threshold. Here the residue corresponding to each of the difference phasors are obtained from a linearized system model which is known a-priori.

This means that for each mode under consideration a few locations or buses, which are at least two, are selected in each geographical area corresponding to the two machine groups.

At least two measurement units are placed in each geographical area based on the residual analysis where the residue magnitude are above a threshold value and the angles of each residue within a geographical area is also within a pre defined range. As an example measurements at a first, second, third and fourth location LI-1, LI-2, and LI-3 and LI-4 in the first geographical area A_I provide a first measured phasor PM1, a second measured phasor PM2, a third measured phasor PM3 and a fourth measured phasor PM4, respectively, while measurements at a first, second and third location LII-1, LII-2 and LII-3 in the second geographical area provides a fifth measured phasor PM5, a sixth measured phasor PM6 and a seventh measured phasor PM7, respectively.

A single input twelve output linearized system model was created from detail system data. These twelve outputs are formed as voltage angle differences between different geographical areas as follows. In the example given above a first difference phasor DP1 is formed on the difference between the first and the fifth phasor PM1 and PM5, a second difference phasor DP2 is formed on the difference between the first and the sixth phasor DP1 and DP6, a third difference phasor DP3 is formed on the difference between the first and the seventh phasor DP1 and DP7 are determined. Also a fourth difference phasor DP4 is formed on the difference between the second and the fifth phasor DP2 and DP5, a fifth difference phasor DP5 is formed on the difference between the second and the sixth phasor DP2 and DP6 and a sixth difference phasor DP6 is formed on the difference between the second and the seventh phasor DP2 and DP7 are determined. Furthermore a seventh difference phasor DP7 is formed on the difference between the third and the fifth phasor DP3 and DP5, an eighth difference phasor DP8 is formed on the difference between the third and the sixth phasor DP3 and DP6, and a ninth difference phasor DP9 is formed on the difference between the third and the seventh phasor DP3 and DP7 are determined. Finally a tenth difference phasor DP10 is formed on the difference between the fourth and the fifth phasors PM4 and PM5, an eleventh difference phasor DP11 is formed on the difference between the fourth and the sixth phasor DP4 and DP6 and a twelfth difference phasor DP12 is formed on the difference between the fourth and the seventh phasor DP4 and DP7 are determined, A residue analysis is then being run as a completely offline procedure on these difference phasors, i.e. on the differences between the available output signals. The residue analysis may here be based on voltage angles between two areas. Residue analysis is here performed in a well-known fashion. The residue analysis provides residue magnitudes and residue angle. The residue magnitudes obtained from the residue analysis are then compared with a residue magnitude threshold. If the residue magnitudes are sufficiently high, i.e. showing good observability of the inter-area mode, and thus are above the residue magnitude threshold then these differences are selected as candidate phasors provided the angle of those phasor residues stay within a pre defined limit. This is required to make sure that all the measured phasors from one particular geographical area does not cancel each other due to large difference in residue angle while added together. The locations, for instance buses, from where the phasors have been taken that provide these candidate phasors, are then determined to be candidate locations for the placement of measurement units, i.e. for candidates to be used as location combinations.

If for instance the residue analysis of the first, second, fourth, fifth, seventh and eighth difference phasors DP1, DP2, DP4, DP5, DP7 and DP8 provide magnitudes that are above the threshold and satisfy the phase angle criteria as stated above, while the others do not, then the locations of measured phasors that provide these difference phasors are selected as location combinations, which location combinations identify where measurement units are to be placed. In the present example the locations where the first, second, third, fifth and sixth pre-measured phasors PM1, PM2, PM3, PM5 and PM6 were collected are selected to provide location combinations for placing of phasor source combinations, i.e. for selection of location combinations identifying locations where measurement units are to be placed. These locations, that are here the first, second and third locations LI-1, LI-2 and LI-3 in the first geographical area and the first and second locations LII-1 and LII-2 in the second geographical area, were thus selected for placing of the first, second, third, fourth and fifth measurement units 10, 12, 14, 16 and 18. By placing measurement units at these selected locations the required phasor source combinations are then obtained for use in on-line power oscillations damping control. In the present example these locations may thus be bus positions.

It is here possible to also check the angles between difference phasors, i.e. the phase differences from two areas and select at least two phasors, i.e. phase differences between two areas, such that the difference in angles of that combination is small. This means that residue analysis of a difference phasor that is provided at a large angle from another difference signal may be rejected even though the threshold is exceeded.

After the first and second groups of measurement units have been selected in this way, they may then be used for providing on-line measured phasors to the actuator.

In relation to these measured phasors, there may be made a further analysis. The difference phasor used in the pre-performed residue analysis having the highest magnitude is here denoted a main difference phasor. If for instance the first difference phasor DP1 is this main difference phasor, then for this difference phasor there is provided a reference angle offset α1, which in this case is zero. This is thus a reference phase. This offset is then assigned to the corresponding selected location combination. This means that a difference angle of the phasor difference analysis providing the highest magnitude is given the reference phase, a zero angle. This zero angle is then assigned to all phase angle differences that are determined based on phasors obtained form the same measurement unit combination, i.e. from measurement units placed at the locations giving rise to this difference phasor DP1, where the location combination in this case is the first locations LI-1 and LII-1 in the first and second geographical areas. This means that if for instance measurement unit 10 in the first group and measurement unit 16 in the second group were to provide these phasors, then this reference phase or zero angle would be assigned to all difference signals that are subsequently determined based on phasors measured by these two measurement units. Furthermore the difference in phase between the main difference phasor and other difference phasor associated with selected location combinations of the other difference phasors are here also determined beforehand and assigned to the corresponding location combinations. This means that if for instance the second locations LI-2 and LII-2 in the first and second geographical areas have been selected because the residual analysis made for this location combination exceeded the residue threshold, the difference in phase between the corresponding difference phasor DP5 and the main difference phasor DP1 is then set, stored and assigned this other location combination, i.e. to the location combination associated with the fifth difference phasor DP5. Since the second measurement unit 12 and the fifth measurement unit 18 are placed at these locations LI-2 and LII-2, this means that this phase difference or angle offset is applied on all future phasors obtained from this location combination or rather from these two measurement units. In this way the phase offset is applied for angle phase adjustments of difference signals obtained from phasors subsequently measured in these locations.

The other differences that are selected are all assigned angle offsets in relation to this main difference phasor in the same way for. Therefore the location combination associated with the second difference phasor DP2 is assigned a second angle offset α2 that is the difference in angle between the first and the second difference phasor. This offset is then set for use with difference signals that are determined based on the first and the fifth measurement unit 10 and 18. The location combination associated with the fourth difference phasor DP4 is assigned a third angle offset α3 that is the difference in angle between the first and the fourth difference phasors. This offset is then set for use with difference signals that are determined based on the second and the fourth measurement units 12 and 16 placed at the locations identified by the corresponding location combination. The location combination associated with the fifth difference phasor DP5 is assigned a fourth angle offset α4 that is the difference in angle between the first and the fifth difference phasors. This offset is then set for use with difference signals that are determined based on the second and the fifth measurement unit 12 and 18. The location combination associated with the seventh difference phasor DP7 is assigned a fifth angle offset α5 that is the difference in angle between the first and the seventh difference phasors. This offset is then set for use with difference signals that are determined based on the third and the fourth measurement units 14 and 16. Finally the location combination associated with the eighth difference phasor DP8 is assigned a sixth angle offset α6 that is the difference in angle between the first and the eighth difference phasors. This offset is then set for use with difference signals that are determined based on the third and the fifth measurement unit 14 and 18. These angle offsets or phase differences are thus assigned for use with difference phasors obtained from measurement units placed at the locations of the selected location combinations, i.e. for phasor source combinations associated with the selected location combinations. This is then repeated for all the phasor source combinations of the first and second groups of measurement units.

It is here also possible that locations are omitted even though they provide good results because the phase difference between the difference phasors was close to one hundred and eighty degrees. These can thus be omitted despite having high residue analysis magnitudes.

In another variation of the invention it is possible to apply the above described scheme for locations in one geographical area. This means that there are no phasor source combinations and location combinations, but rather a phasor source and a corresponding location. The residue analysis is then made on the phasors obtained from phasors sources in a geographical area and the angle offsets applied only for the locations in the geographical area in question.

As the different settings made in the system has now been described, here follows a description of the operation of the system in relation to power oscillations damping in the first embodiment of the invention, i.e. when the actuator 32 is operating and measurement units are placed at locations identified by location combinations in the system according to the above-mentioned principle.

The purpose of the power control device of the present invention can be seen as to establish one angle for each geographical area and in case there are more than one for a particular area to improve the quality of the resulting angle by using all available information and merge this information into an equivalent angle. Angle differences between two areas are then used in inter-area oscillations damping.

Figure 3:
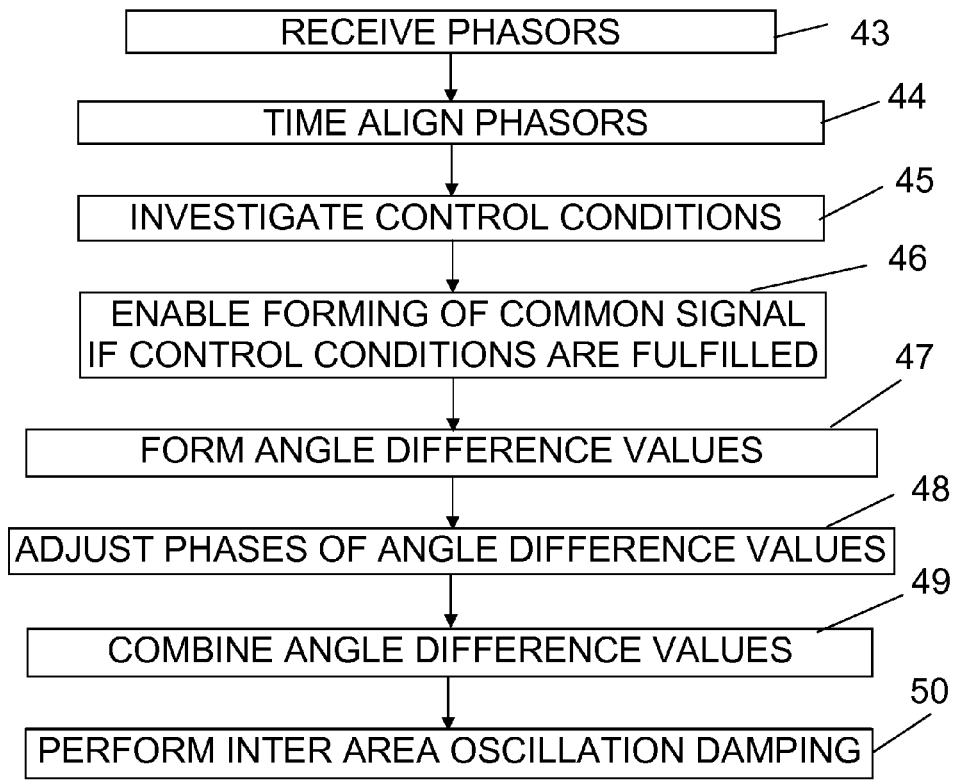

The operation of the power control device 32 of the present invention will now be described in more detail with reference also being made to FIG. 3, which shows a flow chart of a number of method steps in a method of the first embodiment being performed in the power control device 32 in FIG. 1.

The first and second groups of measurement units can supply phasors to the phasor aligning unit 30. More particularly these measurement units provide phasors in the first and second sets of phasors to the phasor aligning unit 30. Therefore the phasor aligning unit 30 receives the first set of phasors from the first group of measurement units and the second set of phasors from the second group of measurement units, step 43, and time aligns the phasors of the two sets with each other, step 44. It thus aligns the first and second sets of phasors with each other in time.

The aligning is controlled from the control unit 33. The phasor aligning unit 30 may provide the control unit 33 with data of how many phasors it has received in each set. These numbers are then transferred together with data of the associated time in the time stamps i.e. the time of generation of the phasors. The control unit 33 then controls when the aligning unit 30 is to forward the phasors in the two sets, i.e. at what points in time this unit 30 is to forward all phasors generated at one particular instance in time.

The control unit 33 here investigates a number of control conditions, step 45, including at least one control condition and allows the phasor aligning unit 30 to release the time aligned values in the two sets when the control conditions have been fulfilled. In this way the control unit 33 enables the forming of a common signal if these control conditions are fulfilled, step 46. How a common signal may be formed will be described shortly.

The control unit 33 can here first of all employ a maximum delay time limit $t_{delay}^{max}$. It here determines the time difference between the time stamps of phasors in the first and second sets and the current time, where these times have the same time reference system, which may be done using A-GPS. It thus compares the time stamps of the phasors in the first and second sets with the current time as provided by the clock 28, and if the time stamps of the first and second sets of phasors have reached this maximum delay time limit, then the control unit 33 aborts control operation. This may mean that the switchover control unit 41 is instructed to switch over control to local power oscillations damping unit 42, which is a switchover to fallback (or no) control. In other words, if sufficient data has not been received before this maximum delay time limit the wide area control to be provided is considered unsuccessful.

However, according to the invention, the control unit 33 determines if a first control condition is fulfilled. This first control condition may here be determined through comparing each set of phasors with a corresponding phasor number threshold. This phasor number threshold may specify a minimum number of phasors and therefore be a minimum number threshold that specifies the minimum number of phasors that have to be received from each geographical area. This may be expressed as $n_i^{min}$, i=1, . . . , An. This is the minimum number of phasors that at least needs to be received from each area in order for the synchronization or phasor alignment to be considered successful. Thus, when a sufficient number of phasors $n_i^{min}$ have been received for each area, i.e. the number of phasors in each set is equal to or above the corresponding phasor number threshold, then the control unit 33 determines that the first control condition is fulfilled. In one embodiment of the invention, the control unit 33 may order the phasor aligning unit 30 to forward the first and second sets of phasors as soon as these thresholds have been met while the time difference is below the maximum delay time. If each such phasor number threshold has been exceeded the phasor aligning unit thus sends the phasors of the first and second sets to the power control device 32 and moves on to the following sets of phasors corresponding to a following next time slot. It follows that the fastest and most reliable system (in terms of avoiding switchover to fallback control) is obtained with $n_i^{min}=1$, . . . , An. Thus as soon as the at least one phasor is obtained for each area, the phasor aligning unit forwards the phasors of the time slot currently handled and moves on to the next time slot. It also follows that the slowest and least reliable system in terms of avoiding switchover to fall-back control is obtained with $n_i^{min}=n_i$, i=1, . . . , An, i.e. the phasor aligning unit waits till all phasors corresponding to all areas have been received before moving on. Although speed and reliability is reduced, quality of data may be improved through a weighting procedure to be described later on. Here data that is not received in time is discarded. The choice of $t_{delay}^{max}$ and $n_i^{min}$ are system dependent and may be settable via a Human Machine Interface. Naturally the phasor number threshold may be set differently for different geographical areas.

Also a third parameter may be introduced in the synchronization procedure, namely $t_{delay}^{hold} \leq t_{delay}^{max}$. According to this embodiment, the control unit 33 determines a second control condition, which is done through comparing the time difference between the time of generation of the phasors in the sets with a current time and determining that the second condition is fulfilled as soon as this time difference equals a delay time limit. Here the control unit 33 may combine the two control conditions and order the phasor aligning unit 30 to forward its result when both are met. This means that the control unit 33 may wait till the time delay is equal to $t_{delay}^{hold}$. If at this time $n_i \geq n_i^{min}$, i=1, . . . , An, i.e. the number of received phasors for each area is sufficient, then the phasor aligning unit 30 is ordered to forward the phasors in the first and the second sets. If $n_i < n_i^{min}$ for some area, the process will wait till either a sufficient number of phasors corresponding to the area has arrived and then send the data on to the power control device 32 or $t_{delay}=t_{delay}^{max}$ in which case a switchover to fallback control is initiated. This approach would be as reliable as the previous embodiment (for the same set of $n_i^{min}$, i=1, . . . , An). However, it would in general not be as fast since a holding time is introduced. On the other hand quality of data may in general be improved since there is most of the time a waiting for additional phasors to arrive. The variance of the time delay would also decrease and thus making it easier to compensate for.

After the phasor aligning unit 30 has been controlled in one of the above described ways, it supplies the phasors in the first and the second sets to the difference forming unit 34. Neither this unit nor later units in the chain, like the combining unit, can operate before they receive the aligned phasors of the first and the second sets. This means that the operation of the difference forming unit and later unit in the chain, including the combining unit, is enabled through the above-mentioned control, i.e. when the first and possibly also the second control condition is fulfilled. The phasor aligning unit 30 then continues to operate in the same way for following sets of phasors from the first and second groups of measurement units.

According to the first embodiment of the invention, the phasor aligning unit 30 provides the first and second sets of phasors to the difference forming unit 34. This unit 34 thus receives the first set of phasors P1, P2 and P3 from the first group of measurement units 10, 12 and 14 and the second set of phasors P4 and P5 from the second group of measurement units 16 and 18, which have here already been aligned with each other. Thereafter the difference forming unit 34 forms at least one difference signal based on phasor data originating in the phasors of the first and second sets. In this first embodiment this phasor data are the phasors that have been measured. Therefore the difference forming unit here forms several difference signals between the phasors in the first and second sets according to phasor source combinations. In this first embodiment it forms difference signals in the form of angle difference values between the angles of the first and second set of phasors according to the selected phasor source combinations, step 47. It thus forms a first angle difference value D1 between the first phasor P1 in the first set and the fourth phasor P4 in the second set, a second angle difference value D2 between the first phasor P1 in the first set and the fifth phasor P5 in the second set, a third angle difference value D3 between the second phasor P2 in the first set and the fourth phasor P4 in the second set, a fourth angle difference value D4 between the second phasor P2 in the first set and the fifth phasor P5 in the second set, a fifth angle difference value D5 between the third phasor P3 in the first set and the fourth phasor P4 in the second set and finally a sixth angle difference value D6 between the third phasor P3 in the first set and the fifth phasor P5 in the second set.

These difference signals, which in this embodiment are angle difference values D1, D2, D3, D4, D5 and D6, are then provided to the phase adjusting unit 36, which goes on and adjusts the phases of phasor data to the reference phase. In this embodiment it means that the phase adjusting unit 36 adjusts the phases of the difference signals for phasor source combinations according to the phase difference assigned to the corresponding location combination. In this first embodiment it thus adjusts the angle difference values according to the difference in phase assigned to the corresponding location combinations, step 48. This means that for the example given above the first difference signal D1 is shifted with phase α1, which is zero and thus involves no shifting, the second difference signal D2 is shifted with phase α2, the third difference signal D3 is shifted with phase α3, the fourth difference signal D4 is shifted with phase α4, the fifth difference signal D5 is shifted with phase α5 and the sixth difference signal D6 is shifted with phase α6.

Thus, if there are phase differences between each phasor of such measurement signals, then the phase adjusting unit can be used to provide appropriate phase compensation to each signal to align the angle differences such that no phase opposition or reduction in amplitude is possible in later processing steps. The phase adjusting unit may be implemented in the form of lead-lag compensator or any other type used to align the phases of the difference signals, such that all the angle differences are aligned.

The phase adjusted difference signals, which make up phasor data, are then supplied from the phase adjusting unit 36 to the combining unit 38, which combines phasor data originating in phasors of the first set and phasors in the second set in order to provide a common signal that is based on the at least one difference signal and the combined phasor data. In this embodiment phasor data originating in phasors of the first set and phasors in the second set are the difference signals. This therefore means that the combining unit combines the difference signals in order to obtain a common signal, which in this first embodiment is a common angle value, step 49, and the common signal is thereafter provided to the wide area power oscillations damping unit 40 as a common signal for use in inter-area oscillation damping in relation to the first and the second geographical areas. Thereafter the wide area power oscillations damping unit 40 performs inter-area oscillation damping based on the common signal, step 50.

Figure 4:
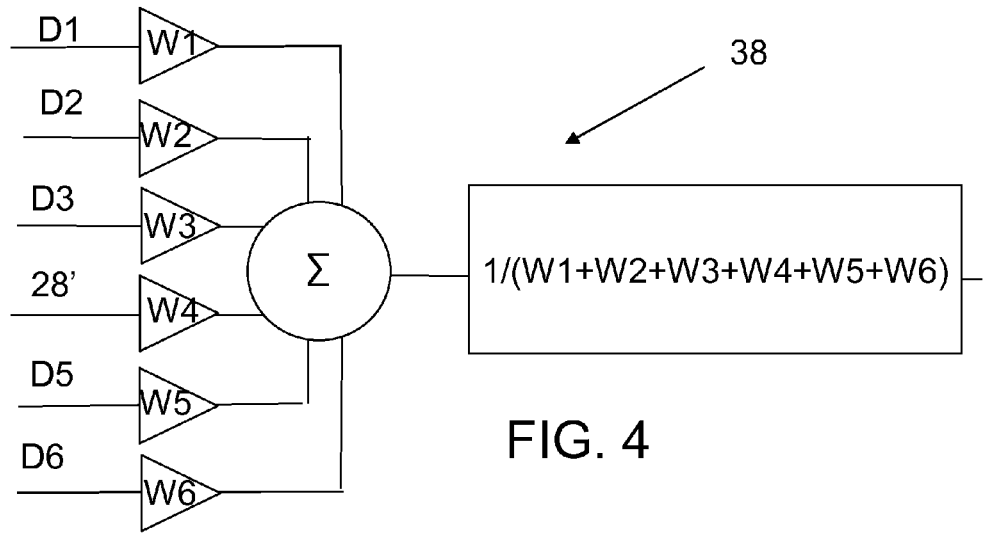

The combining may be a weighted average of phasor data, which phasor data in this first embodiment are the difference signals D1-D6. FIG. 4 shows a block schematic of a combining unit which may be used in this regard. Here there are six amplifiers, each arranged to amplify a received difference signal D1, D2, D3, D4, D5 and D6 with a corresponding weight W1, W2, W3, W4, W5 and W6. These amplifiers are then connected in parallel to a summing unit, which in turn sums the thus weighted difference signals. Finally the sum signal is provided to a dividing unit, which is arranged to divide the sum signal with the sum of the weights W1, W2, W3, W4, W5 and W6 in order to obtain the common signal.

In this way it is possible to provide a common signal that is based on the at least one difference signal and the combined phasor data that considers the difference between several phasors measured in the two geographical areas, which increases the robustness of the control. The weighted sum therefore ensures that individual phase jumps in the phasor angles during disturbances can be smoothed out.

The phase adjustment performed by the phase adjusting unit furthermore ensures that the phasors in one area if being combined through being summed algebraically do not reduce the magnitude of the common signal. It also allows loss or missing of one or more signals from a set and still provides an effective common signal as input to the power oscillations damping units.

Here it is thus possible that if one phasor in one set of phasors is discarded due to a control condition, then this phasor can be omitted from the combining.

The phasor aligning unit may provide flags for the combining unit to indicate which measurements values are missing that relate to a specific point in time. Upon receiving the flags, the combining unit will set the weights corresponding to those phasors to be zero, so that with the rest of the available phasors the power oscillations damping unit can perform its task. This may also have an influence on the phase adjustment being made.

It is possible to operate the power control device in a similar manner for other modes of operation for instance in relation to mode M2 for the third and fourth geographical area.

It is possible to vary the power control device in many ways.

It is for instance possible to switch the positions of the difference forming unit and the combining unit.

Figure 5:
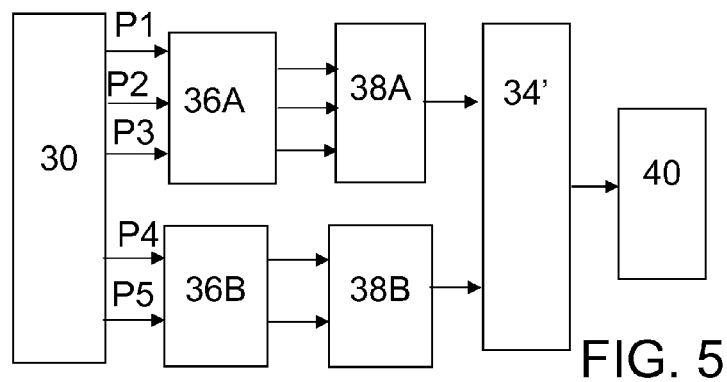

A power control device according to such a variation is schematically shown in FIG. 5. Here the phasor aligning unit 30 is connected to phase adjusting unit. The phase adjusting unit here includes two phase adjusting elements 36A and 36B, where a first phase adjusting element 36A receives the phasors P1, P2 and P3 from the first geographical area, while a second phase adjusting element 36B receives the phasors P4 and P5 from the second geographical area. Also the combining unit here includes two combining elements 38A and 38B, which may each be realized according to the principles shown in FIG. 4. Here a first combining element 38A is connected to the first phase adjusting element 36A, while a second combining element is connected to the second phase adjusting element 36B. The two combining elements are then connected in parallel to a difference forming unit 34', which in turn is connected to the wide area power oscillations damping unit 40. If in this variation of the invention more than one phasor is received from each geographical area and they are not properly aligned in phase (i.e. if all the available phasors in that area have the same oscillating frequency but are not in-phase to each other), then the angles in each area are first passed from the phasor aligning unit 30 to the corresponding phase adjusting element 36A and 36B, which can adjust the phases of all the phasors in the corresponding set to each other or a reference phase. From the phase adjusting unit the phase adjusted phasors of a set is then passed to the corresponding combining element 38A and 38B, where each combining element 38A and 38B provide averaged weighted sums of the adjusted phasor angles of a corresponding set. The averaged weighted sums of the two sets are then sent to the difference forming unit 34', which forms a difference phasor between the two combined phasors that is then provided as the combined signal to the wide area power oscillations damping unit 40. The phase compensation ensures that the phasors in one area, if they are summed algebraically, do not reduce the magnitude of the resultant signal. It also allows loss or missing of one or more signals from a set while still providing an effective average signal as input to the power oscillations damping unit. The weighted sum ensures that the individual phase jumps in the angle signal during disturbances can be smoothed out. Also, if one or more phasor does not arrive within the specified waiting criteria the common signal for the power oscillations damping unit is generated using the rest of the available phasors by making the appropriate weight of the corresponding missing phasor angle to zero.

Here it is also possible to remove the phase adjusting unit. This is also possible in the first embodiment.

Figure 6:
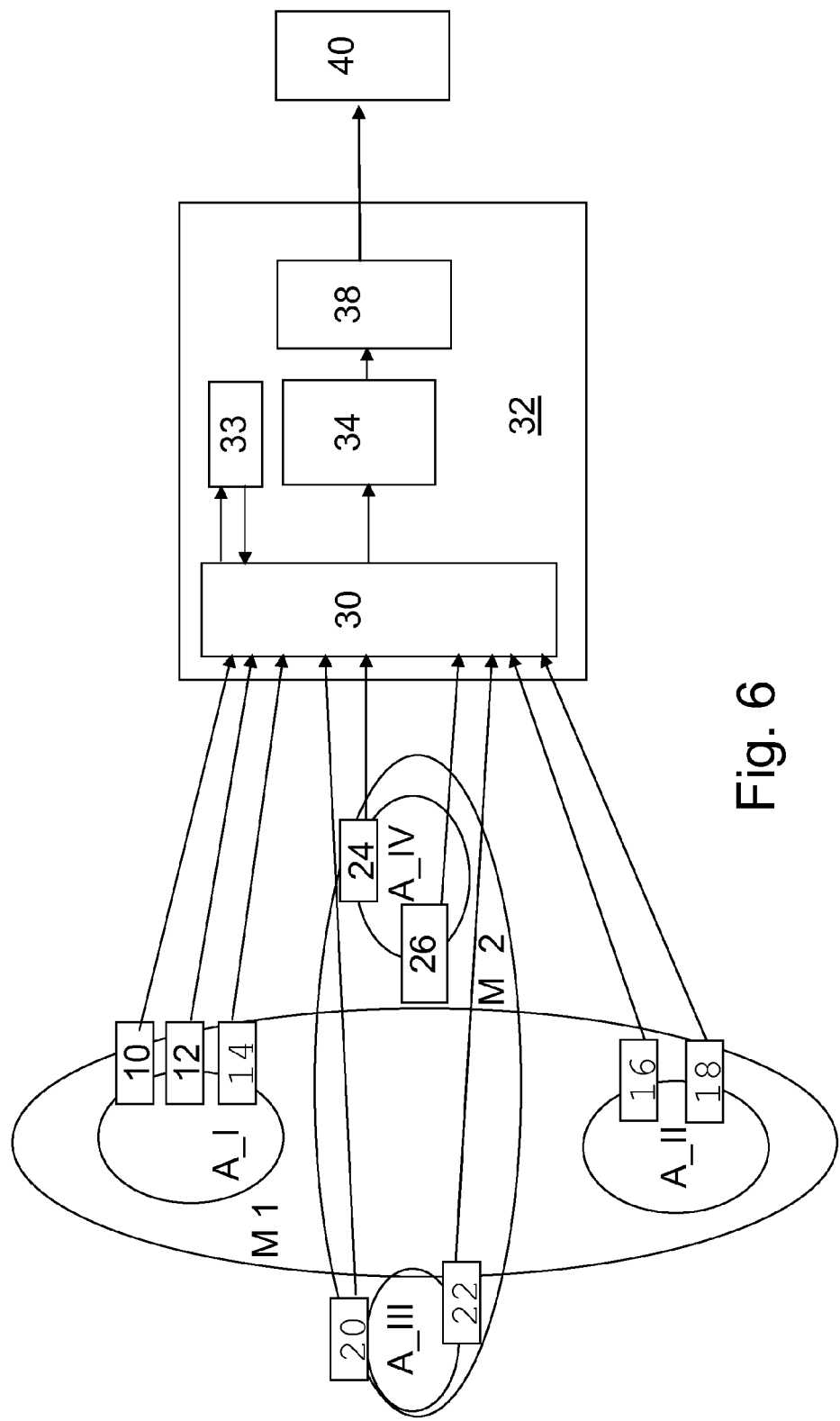

It is possible that the wide area power oscillations damping unit, phase and adjusting unit are not a part of the power control device. An example of this is shown in FIG. 6, which in other respects is similar to FIG. 1. Switchover to local fallback control will in this version of the invention be provided by a wide area power oscillations device 40 to which the power control device 32 is connected. It should be realized that also the difference forming unit and the combining unit may be removed. In its simplest form the power control device therefore only includes the phase aligning unit and the control unit. Also the clock 28 may be provided as an external entity.

Figure 7:
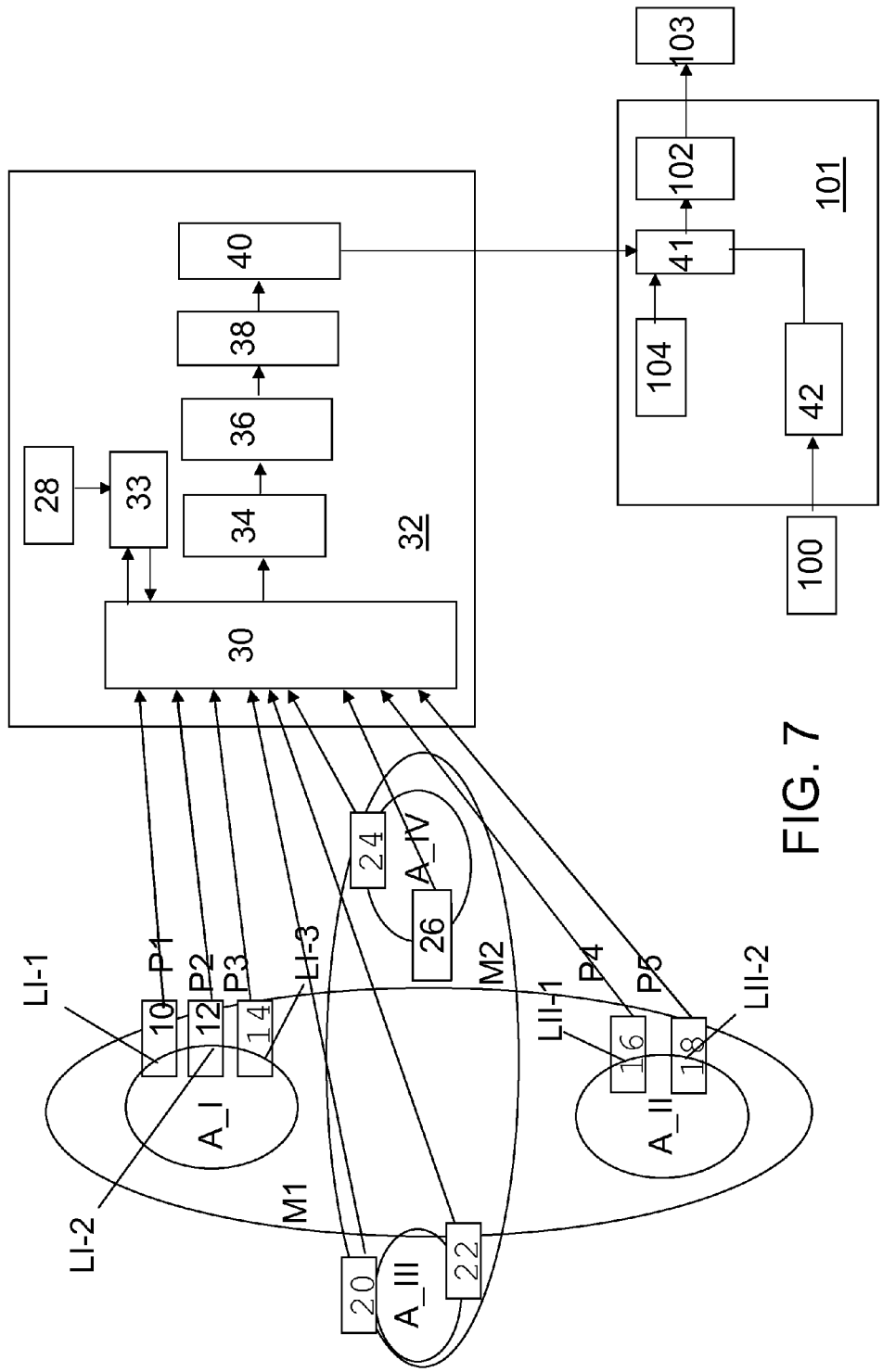

Another variation of the power control device according to a third embodiment of the invention is shown in FIG. 7. This figure includes the same units as in FIG. 1. However, here the power control device 32 is separated from the general power control system 101 provided for the actuator 103. For this reason the power control device 32 is provided with one clock 28, while the general power control system 101 is provided with a second clock 104, with advantage also a GPS clock. The main difference from the first embodiment shown in FIG. 1 is that the power control device 32 and the general power control system 101 are implemented in different computers, separated by a distance, which distance may be arbitrary and considerable. Therefore the wide area power oscillations damping unit 40 here sends the control signal over a communication network, preferably with a time stamp related to the time corresponding to the time of measurement of the processed phasors. The clock 104 of the general power control system 101 is here used to again time stamp the control signal when it arrives at the general power control system 101. Based on these time stamps the time delay can then be estimated. If the time delay is too large, the switchover unit 41 performs switchover to fallback local power oscillations damping 42.

The control unit may enable the forming of a common signal according to any combination of control strategies described above, however normally always including the first control condition.

The invention has a number of advantages. The power oscillations damping is insensitive with respect to changing system configurations. Since the common signal is based on more than one phasor, the damping control is less sensitive to changing system configurations.

The wide area power oscillations damping unit is also resilient against signal loss and unacceptable delays of signals. If one or more phasors is delayed in time over an acceptable limit, the rest of the available phasors will be synchronized and sent by the phasor aligning unit indicating the loss of one or more signals. In other words, if one phasor in a set of phasors does not arrive at the phasor aligning unit in time, then the difference forming unit will proceed with forming difference signals based on the phasors it has and the combining unit combine phasor data with the weight corresponding to the missing phasor data set equal to zero. The phasor aligning unit is here configured to align the measured signals such that the effectiveness is not reduced in case some of them are missing. The invention also provides redundancy against unavailable measurements, delays or loss of signals at any moments of time.

The phase adjusting provided by the phase adjusting unit ensures that no phase opposition exists between signals that are combined. In this way the weighted sum provides a better magnitude than any one difference. The invention therefore improves the robustness of utilizing redundant measurement values.

The invention allows a significant contribution to the reduction of the delay caused by the phasor aligning unit to be obtained. However, time delays in a feedback loop of a power network controller cannot be completely removed. The previously described units of the power control device in the first and second embodiments are typically part of such a feedback loop. The invention according to some embodiments can thus be used to remove some of these delays because late arriving phasors are omitted from the control. However, it is possible to compensate for some further delays. Efficiently, known controllers acting as wide area power oscillations damping units can in this respect be used without the need to modify their structure. In order to compensate for the time delays, controller parameters are suitably adjusted in accordance with the following variation of the present invention.

Generally, power networks utilise so-called lead-lag controllers to improve undesirable frequency responses. Such a controller functions either as a lead controller or a lag controller at any given time point. In both cases a pole-zero pair is introduced into an open loop transfer function. The transfer function can be written in the Laplace domain as:

$$\frac{Y}{X} = \frac{s-z}{s-p}$$

where X is the input to the controller, Y is the output, s is the complex Laplace transform variable, z is the zero frequency and p is the pole frequency. The pole and zero are both typically negative. In a lead controller, the pole is left of the zero in the Argand plane, $|z|<|p|$, while in a lag controller $|z|>|p|$. A lead-lag controller consists of a lead controller cascaded with a lag controller. The overall transfer function can be written as:

$$\frac{Y}{X} = \frac{(s-z_1)(s-z_2)}{(s-p_1)(s-p_2)}$$

Typically $|p_1|>|z_1|>|z_2|>|p_2|$, where $z_1$ and $p_1$ are the zero and pole of the lead controller and $z_2$ and $p_2$ are the zero and pole of the lag controller. The lead controller provides phase lead at high frequencies. This shifts the poles to the left, which enhances the responsiveness and stability of the system. The lag controller provides phase lag at low frequencies which reduces the steady state error.

The precise locations of the poles and zeros depend on both the desired characteristics of the closed loop response and the characteristics of the system being controlled. However, the pole and zero of the lag controller should be close together so as not to cause the poles to shift right, which could cause instability or slow convergence. Since their purpose is to affect the low frequency behaviour, they should be near the origin.

The article "Application of FACTS Devices for Damping of Power System Oscillations", by R. Sadikovic et al., proceedings of the Power Tech conference 2005, Jun. 27-30, St. Petersburg RU, the disclosure of which is incorporated herein for all purposes by way of reference, addresses the selection of the proper feedback signals and the subsequent adaptive tuning of the parameters of a power oscillation damping (POD) unit or controller in case of changing operating conditions. It is based on a linearized system model, the transfer function G(s) of which is being expanded into a sum of N residues:

$$G(s) = \sum_{i=1}^{N} \frac{R_i}{(s - \lambda_i)}$$

Figure 8A:
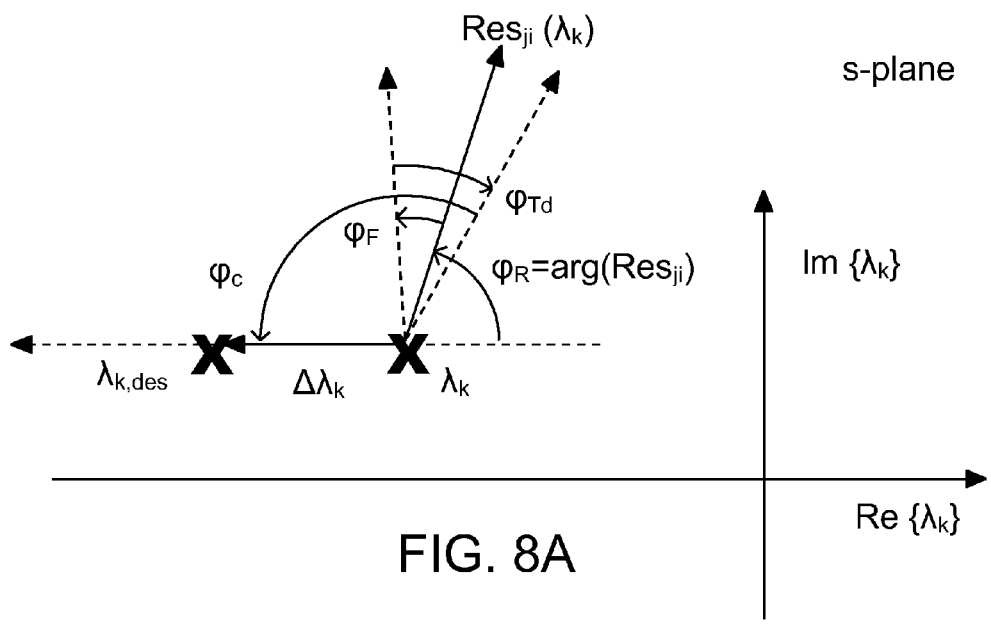

The N eigenvalues A correspond to the N oscillation modes of the system, whereas the residue $R_i$ for a particular mode gives the sensitivity of that mode's eigenvalue to feedback between the output and the input of the system. It should be noted that in complex analysis, the "residue" is a complex number which describes the behavior of line integrals of a meromorphic function around a singularity. Residues may be used to compute real integrals as well and allow the determination of more complicated path integrals via the residue theorem. Each residue represents a product of modal observability and controllability. FIG. 8A provides a graphical illustration of the phase compensation angle $\phi_c$ in the s-plane caused by the wide area power oscillations damping unit 40 in order to achieve the desired shift $\lambda_k = \alpha_k + j \cdot \omega_k$ of the selected/critical mode k, where $\alpha_k$ is the modal damping and $\omega_k$ is the modal frequency. The resulting phase compensation angle $\phi_c$ is obtained as the complement to $+\pi$ and $-\pi$, respectively, for the sum of all partial angle contributions obtained at the frequency $\omega_k$ starting from the complex residue for mode $\lambda_k$, input I and output j, is $\text{Res}_{ji}(\lambda_k)$, all employed (low- and high-pass) prefilters. $\phi_R$ is the angle of residue and $\phi_F$ is the phase shift caused by the prefilters.

FIG. 8A also graphically illustrates a pole-shift in the s-plane for a power oscillations damping unit in order to achieve a desired shift $\lambda_k = \alpha_k + j \cdot \omega_k$ of a mode of interest, k, where $\alpha_k$ is the modal damping and $\omega_k$ is the modal frequency. The resulting phase compensation angle $\phi_c$ is obtained as the complement to $+\pi$ and $-\pi$, respectively, for the sum of all partial angle contributions obtained at the frequency $\omega_k$ starting from the complex residue for mode $\lambda_k$, input i and output j, is $\text{Res}_{ji}(\lambda_k)$, all employed (low- and high-pass) prefilters. $\phi_R$ is the angle of residue and $\phi_F$ is the phase shift caused by the prefilters. $\phi_{Td}$ is the phase shift representing time delay Td at frequency $\omega_k$.

Figure 8B:
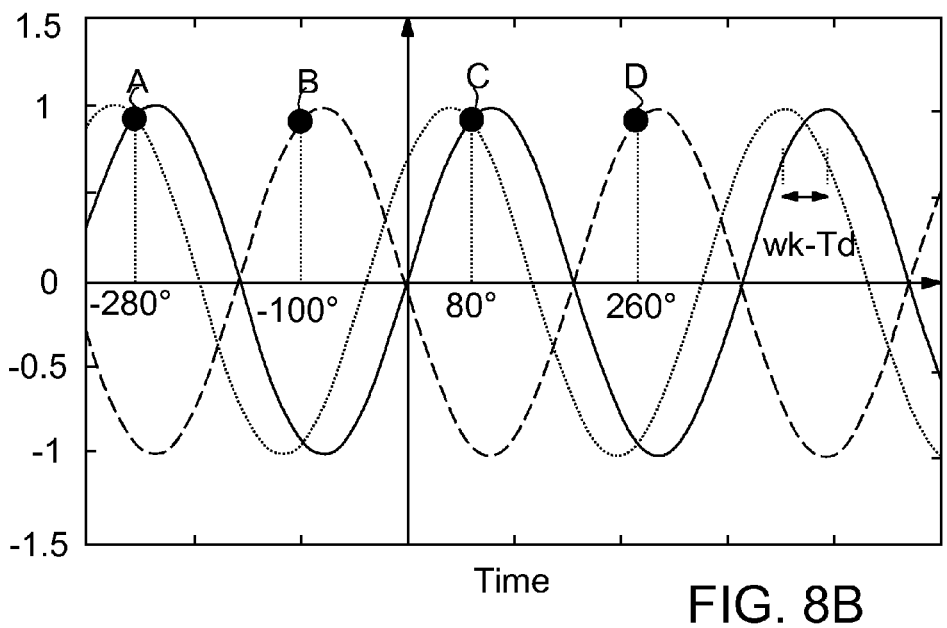

The adjustment of the controller parameters is determined in the following manner. With reference to FIG. 8B, a common signal is denoted by the dotted oscillating line. For simplicity, an undamped sine wave is shown. The common signal is phase shifted from the oscillating signal, represented by a solid line. The phase shift between the signal and the feedback signal is ($\omega_k \cdot Td$) where $\omega_k$ is the frequency of the mode being damped and Td is the time delay. Therefore, the time delay may be described as a phase shift at the oscillatory frequency of interest. It can be seen in FIG. 8B that the time delay corresponds to lagging 60° at the dominant frequency $\omega$. The related modified compensation angles are calculated from the residue, phi. In this example, phi is 80°. The four solutions for the modified compensation angle which compensate for the phase shift are described as; lag to +1, lag to −1, lead to +1, lead to −1. With reference to FIG. 8B, the four solutions are graphically illustrated by the four points on the waves denoted as A, B, C, D, respectively. The actual values in this example can be seen to be −280°, −100°, 80°, 260°, respectively.

The next step in the adjustment of the controller parameters of the present invention utilises Nyquist diagrams. A Nyquist diagram is used in automatic control and signal processing for assessing the stability of a system with feedback. It is represented by a graph in which the gain and phase of a frequency response are plotted. The plot of these phasor quantities shows the phase and the magnitude as the distance and angle from the origin. The Nyquist stability criterion provides a simple test for stability of a closed-loop control system by examining the open-loop system's Nyquist plot (i.e. the same system including the designed controller, although without closing the feedback loop). In the present variation of the invention, the four solutions are plotted on four Nyquist diagrams in order that the optimal solution can be readily determined. FIGS. 9A-9D show an example of four such control solutions.

In FIGS. 9A and 9D the control solutions are not stable because the route of the plot encircles the stability point −1,0. FIG. 9B shows a Nyquist diagram of the first stable control solution based on remote feedback signals. The black point 52 near the real axis represents the gain stability margin and the black point 54 on the unit circle indicates the phase stability margin. The route of the plot forms a clear loop which shows that the control system will have a relatively high stability margin. FIG. 9C shows a Nyquist diagram of the second stable control solution of the example in FIGS. 8A and 8B. The black point 56 near the real axis represents the gain stability margin. The phase stability margin is infinite in this case, as there is no intersection with unit circle. The route of the plot forms a clear loop which shows that the control system will also have a high stability margin. The dot-dash line around zero represents the unit circle.

The Nyquist diagrams for the four solutions are compared in order to determine the single solution having the highest stability for the control system. It should be noted that all four solutions are compensating the same mode and they are designed to achieve the same eigenvalue/pole shift of the critical oscillatory mode in the s-plane. However, due to the eigendynamics of the controller, each resulting closed-loop solution has totally different properties which are visible in the Nyquist diagrams shown in FIGS. 9A-9D. Thus, the influence on the closed loop system behaviour can be different for each solution and it may be possible to clearly identify the single solution having the highest stability for the control system. However, if none of the solutions can clearly be identified as the best solution utilising the Nyquist diagrams then a second stage in the analysis is pursued.

In this second stage, the Bode diagram of each of the solutions is constructed. A Bode diagram is a combination of a Bode magnitude plot above a Bode phase plot. A Bode magnitude plot is a graph of log magnitude versus frequency, plotted with a log-frequency axis, to show the transfer function or frequency response of a linear, time-invariant system. The magnitude axis of the Bode plot is usually expressed as decibels, that is, 20 times the common logarithm of the amplitude gain. With the magnitude gain being logarithmic, Bode plots make multiplication of magnitudes a simple matter of adding distances on the graph (in decibels), since log(a·b)=log(a)+(b). A Bode phase plot is a graph of phase versus frequency, also plotted on a log-frequency axis, usually used in conjunction with the magnitude plot, to evaluate how much a frequency will be phase-shifted. For example a signal described by: A sin($\omega t$) may be attenuated but also phase-shifted. If the system attenuates it by a factor x and phase shifts it by −$\phi$ the signal out of the system will be (A/x) sin($\omega t - \phi$). The phase shift $\phi$ is generally a function of frequency. Phase can also be added directly from the graphical values, a fact that is mathematically clear when phase is seen as the imaginary part of the complex logarithm of a complex gain.

Figure 10A:
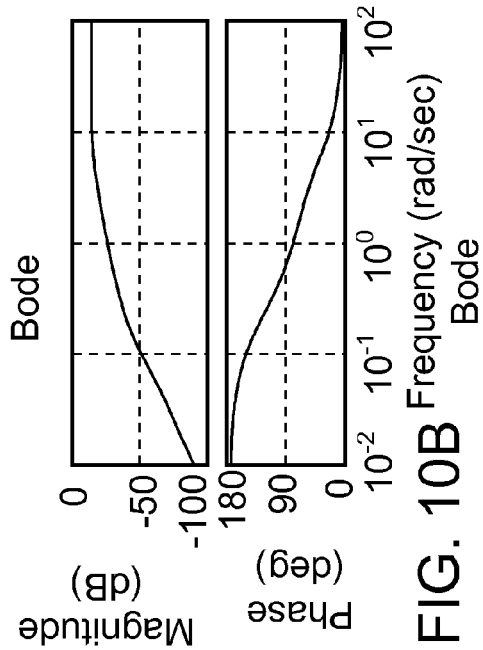
FIG. 10A-10D show Bode diagrams of the four possible solutions.
Figure 10B:
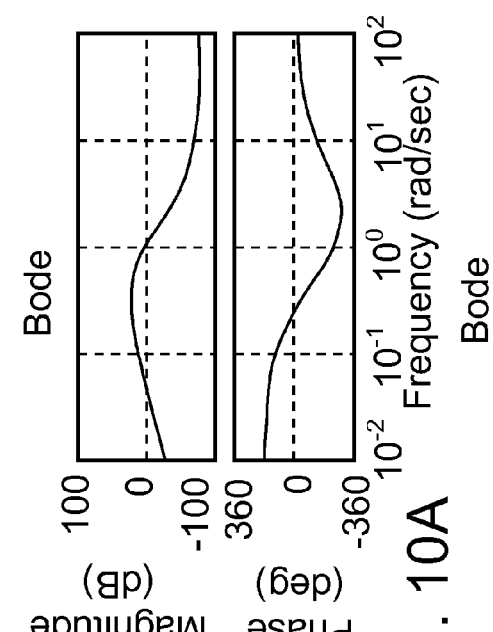
Figure 10C:
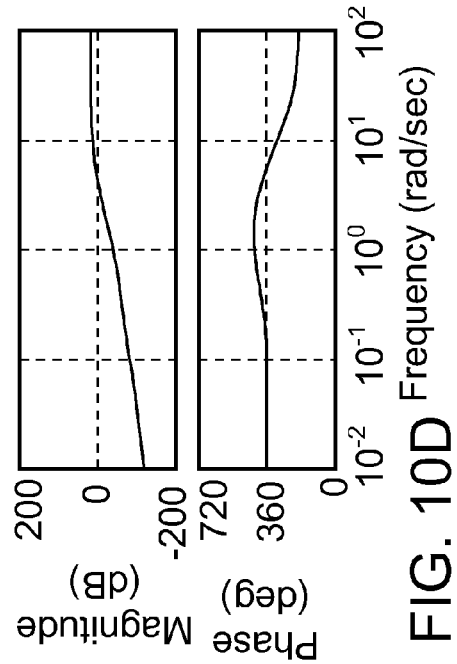
Figure 10D:
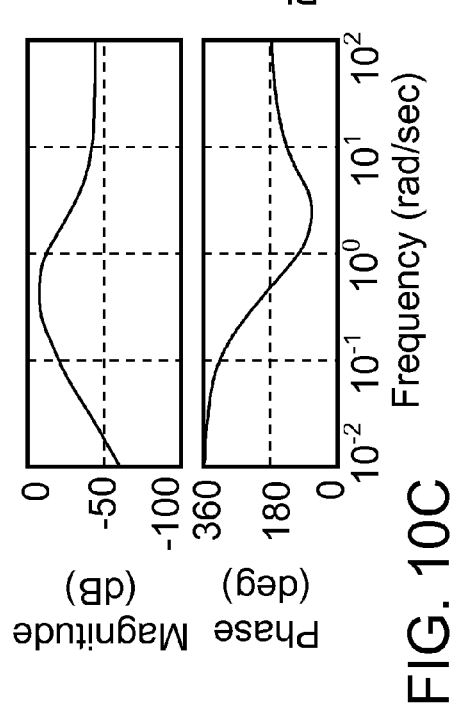

Thus, Bode diagrams for the four solutions are shown in FIGS. 10A-10D and are compared in order to determine the single solution having the most preferable gain characteristics. FIG. 10A shows a Bode diagram of the first control solution based on remote feedback signals. Decaying gain at high frequencies can be observed. FIG. 10B shows a Bode diagram of the second control solution based on remote feedback signals and high gain at high frequencies can be observed. Thus, the influence on the closed loop system behaviour caused by measurement noise and/or interaction with other modes will be different for each solution and it may be possible to clearly identify the single solution having the most preferable gain characteristics. However, if none of the solutions can clearly be identified as the best solution utilising the Bode diagrams of the designed controllers then a third stage in the analysis is pursued.

In the third stage, the complex frequency domain graph of the control solutions may be constructed. In such a complex frequency domain graph, the x-axis represents the real part of s, which is absolute modal damping, and the y-axis represents the imaginary part of s, which is modal frequency in radians per second. The s-plane transforms are commonly known as Laplace transforms hence in the s-plane, multiplying by s has the effect of differentiating in the corresponding real time domain and dividing by s has the effect of integrating. Each point on the s-plane represents an eigenvalue or a transfer function pole.

With reference to FIG. 8A, a control solution is illustrated. The cross denoted as $\lambda_k$ represents the situation without any damping controller and the cross denoted as $\lambda_{k,des}$ shows an improvement in damping caused by the selected controller or power oscillations damping unit, because the change of the eigenvalue location is towards the left half of the s-plane.

It will be clear to the skilled person that in the majority of cases, the first stage of the analysis in which the four solutions are plotted on four Nyquist diagrams will be adequate to distinguish which is the optimal solution. In such instances, the second and third stages are not performed. However, if the comparison of the Nyquist diagrams does not reveal a single optimal solution, then the second stage can be pursued. For example, if three out of the four solutions show equally acceptable solutions, then Bode diagrams of the obtained controllers for only those three solutions are constructed and analysed. Further, if the comparison of the Bode diagrams does not reveal a single optimal solution, then the third stage can be pursued. For example, if two out of the three compared solutions show equally acceptable solutions, then complex frequency domain graphs of only those two solutions in s-plane are constructed and the location of eigenvalues analysed. This enables the single best solution to be determined.

Once the single best solution for the compensation angle has been determined, the phase shift (representative of the time delay) can be rectified. As a result, the closed loop control provides similar performance to a system in which no time delays are present in the feedback loop.

In summary, when in operation, the power oscillations damping unit performs the following method steps. In a first step, four parameters are obtained; the frequency of the oscillatory mode to be damped $\omega_k$, phase shift caused by the prefilters $\phi_F$, the phase shift caused by the residue angle $\phi_R$, and the time-delay in the control loop Td. In a second step, the total compensation angle $\phi_c$ considering the effect caused by the time-delay is calculated in the following manner;

$$\phi_{Td} = \text{rem}(\omega_k \cdot Td, 2\pi)$$

$$\phi = \phi_F + \phi_R - \phi_{Td}$$

$$\phi_c = \text{rem}(\phi, 2\pi)$$

where rem (x, y) is the remainder after division x/y.

In a third step, four possible compensation angles are calculated in the presented controller design procedure (leading and lagging solutions with respect to both positive and negative feedbacks denoted as solutions A, B, C and D). According to a fourth step the four potential controllers are designed from the four compensation angles using the lead-lag approach phasor controller. In a fifth step, the closed loop stability and the stability margin are evaluated for each of the four solutions. The controller(s) having the highest stability margin are selected by using, for example, Nyquist diagrams. In a sixth step, this selection may be combined with the evaluation of the dynamic behaviour of the controller itself. A potential controller solution with decaying gain in high frequency range (lagging) or with decaying gain in low frequency range (leading) is selected depending on its possible interactions with other modes or controllers. This is determined through creating a plot of the gain characteristics, for example, a Bode plot. In a final step, the potential controller solution with the highest stability margin is selected.

The original input data for this sequence of method steps is obtained through repeated analysis of a power system from measured data over a predetermined period of time (a model is created from this data) or from an existing power system model and the procedure described above is executed upon this model. Namely, the first action to be executed comprises obtaining the parameters $\omega_k$, $\phi_F$, $\phi_R$, and Td.

At the end of the procedure the optimal compensation angle is selected and this optimal compensation angle is applied to the feedback signals through adjusting the parameters of the lead-lag controller.

Figure 11:
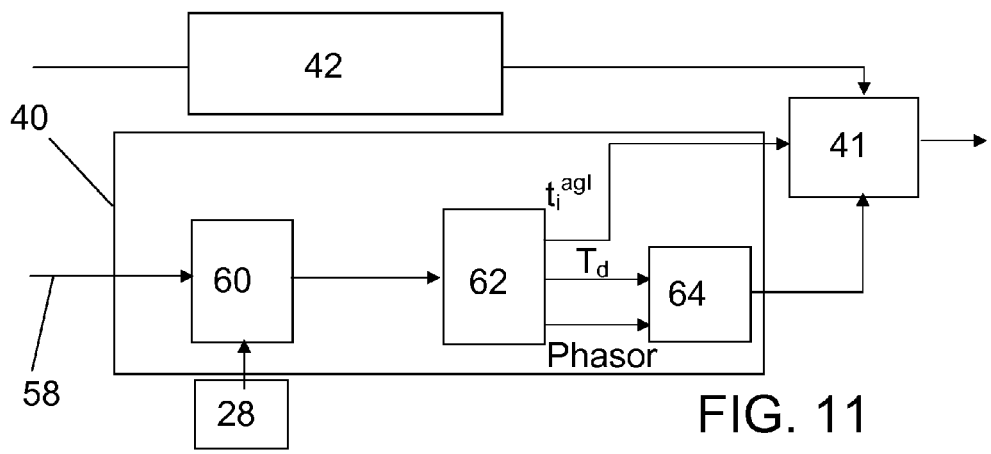
FIG. 11 shows a block diagram of a power oscillations damping unit.

FIG. 11 shows a block schematic of a wide area power oscillating damping unit 40 implementing the above mentioned power control variation and being connected to the clock 28 and in parallel with the local power oscillations damping unit 42 to the switchover unit 41. The wide area power oscillations damping unit 40 is one feedback loop, while the local power oscillations damping unit 42 provides another feedback loop, where both loops are provided for power oscillation damping (POD), which is the same as damping of electromechanical oscillations. The local feedback loop 42 on the top corresponds to a standard configuration, where the input signal is a locally measured quantity e.g. power flow on a local transmission line or locally derived frequency. At the bottom, a wide area feedback loop provided by the wide area power oscillations damping unit 40 according to the variation of the invention is indicated. This loop receives the common signal 58. This value is then time stamped with the time of generation of the corresponding phasors on which it is based. The common signal is time stamped 60 again at the time of arrival to the wide area power oscillations damping unit. The age of the most recently received common signal is estimated and a moving average of the time delay is estimated 62. The common signal and the moving average of the time delay are transmitted to a POD unit 64 such that the appropriate control signal is established. However, if the age of the most recently received common signal is too old, a switch-over 41 to the conventional local power oscillations damping loop 42 based on local measurements is effected.

In summary, the size of the time delay as determined by the control system results in one of the following outcomes:

A time delay of about 10% or less of the oscillating signal period means that the control system proceeds with the control algorithm as if there was no time delay.

A substantial time delay, but of less than 100% of the oscillation signal period, means that the control system proceeds with the control algorithm compensates for the time delay.

A time delay of 100% or more of the oscillation signal period results in the cancellation of the control algorithm to ensure that adverse effects on the power system are avoided.

Importantly, the control system initially determines 41 whether the remote measurement is to be used for control or only the standard local POD setup 42.

Further, the control system of the present invention may intentionally delay the measurement to a predetermined larger time delay.

The power control device according to the invention may with advantage be provided in the form of a processor together with an internal memory including computer program code, which when being operated on by the processor, performs the above mentioned power control device functionality. It will be apparent to the skilled man that the control unit of the present invention may be hardwired or implemented as a computer program.

The forming and combining of difference signals were in the example given above described as being performed on angles. It should be realized that the same principle may be used on a whole phasor instead, i.e. through also considering magnitudes. It should also be realized that the phase adjusting unit may be omitted from the power control device. In it simplest form the device may only include the phase difference forming unit and the combining unit, which would then be communicating with other device implementing the phasor aligning unit and the power oscillations damping unit.

In one variation the process control device may be run on a wide-area monitoring and control platform. In a further preferred embodiment, the power control device of the present invention may be run on a PMU.

In a further embodiment, the power control device of the present invention may be run on a FACTS device, specifically the low level power electronics control platform for the FACTS device, or alternatively on a fast acting device such as an AVR or a direct load modulator.

The skilled man will be aware that such time-stamped phasor data and the associated calculated compensated controller parameters may be stored in a memory of the controller. When the actual time delay is determined by controller, then it is possible that the associated compensated controller parameters have already been calculated and need only be retrieved from the memory, thereby minimizing the processing in the controller.

Whilst the foregoing description of a variation of the invention describes a system for compensation of a time delay in the field of power oscillations damping control, the skilled person will be aware that further embodiments may be envisaged. Specifically, control schemes for remote voltage control and/or control schemes for avoiding loss of synchronism.

What is claimed is:

1. A method for providing improved control of a power transmission system having a computer connected to a first group of measurement units in a first geographical area and providing a first set of on-line measured phasors and the computer connected to a second group of measurement units in a second geographical area and providing a second set of on-line measured phasors, where the first and second groups of measurement units each include at least two measurement units and the phasors in the first and second sets are generated simultaneously, the method comprising the steps of:

receiving at the computer the first set of phasors from the first group of measurement units and the second set of phasors from the second group of measurement units, aligning the first and second sets of phasors with each other in time via software executing on the computer, comparing the number of phasors in each set of phasors with a corresponding phasor minimum number threshold with software executing on the computer, the computer determining that a first control condition is fulfilled if each such phasor number threshold has been exceeded, and the computer generating a control signal if at least said first control condition is fulfilled, where this control signal is based on the obtained phasors in the first and second sets and provided for use in inter-area oscillations damping in relation to the first and the second geographical areas.

2. The method according to claim 1, wherein the step of enabling the provision of a control signal is performed as soon as the first control condition is fulfilled.

3. The method according to claim 1 further comprising the step of comparing the time difference between the time of generation of the phasors in the sets with a current time and determining that a second control condition is fulfilled as soon as this time difference equals a delay time limit.

4. The method according to claim 3, wherein the step of enabling the provision of a control signal is performed as soon as also the second control condition is fulfilled.

5. The method according to claim 1, further comprising the step of comparing the time difference between the time of generation of the phasors in the sets with a current time and disabling the provision of the control signal if this time difference equals a maximum delay time limit.

6. The method according claim 3, wherein the current time is obtained using Assisted Global Positioning System.

7. The method according to claim 1, further comprising the step of providing a control signal through forming at least one difference signal based on phasor data originating in the phasors of the first and second sets, and combining phasor data originating in phasors of the first set and phasors of the second set.

8. The method according to claim 7, wherein the step of combining comprises providing a weighted average of the phasor data.

9. The method according to claim 7, wherein the step of combining comprises combining phasor data from the phasors in the first set for forming a first combined signal and combining phasor data from phasors in the second set for forming a second combined signal, the step of forming at least one difference signal comprises forming a difference signal based on the first and second combined signals, where the control signal is said difference signal.

10. The method according to claim 7, wherein the step of forming at least one difference signal comprises forming difference signals between the phasors of the first and second sets and the step of combining comprises combining the difference signals.

11. The method according to claim 1, further comprising the step of adjusting the phases of phasor data to a reference phase.

12. The method according to claim 1 where the measurement units in the first and second groups are placed at locations being selected through pre-performed residue analyses made for off-line measured phasors from these locations having residue magnitudes above a residue magnitude threshold.

13. The method according to claim 12, wherein a phasor associated with a location in a geographical area for which a corresponding pre-performed residue analysis has the highest magnitude is denoted a main phasor, which location is assigned the reference phase.

14. The method according to claim 1 further comprising the step of performing wide area oscillations damping based on the control signal.

15. A power control device for providing improved control of a power transmission system, said system having a first group of measurement units in a first geographical area and providing a first set of on-line measured phasors and a second group of measurement units in a second geographical area and providing a second set of on-line measured phasors, where the first and second groups of measurement units each include at least two measurement units and the phasors in the first and second sets are generated at the same instant in time, said power control device being configured to obtain the first set of phasors from the first group of measurement units and the second set of phasors from the second group of measurement units, the device further comprising:
  a phasor aligning unit configured to align the first and second sets of phasors with each other in time, and
  a control unit configured to compare the number of phasors in each set of phasors with a corresponding phasor minimum number threshold, determine that a first control condition is fulfilled if each such phasor number threshold has been exceeded and enable the provision of a control signal if at least said first control condition is fulfilled, where this control signal is based on said obtained phasors in the first and second sets and provided for use in inter-area oscillation damping in relation to the first and the second geographical areas.

16. The device according to claim 15, wherein the control unit is configured to enable the provision of the control signal as soon as the first control condition is fulfilled.

17. The device according to claim 15, wherein the control unit is further configured to compare the time difference between the time of generation of the phasors in the sets with a current time and determine that a second control condition is fulfilled as soon as this time difference equals a delay time limit.

18. The device according to claim 15, wherein the control unit is configured to compare the time difference between the time of generation of the phasors in the sets with a current time and disable the provision of a control signal if this time difference equals a maximum delay time limit.

19. The device according to claim 18, wherein the control unit is configured to enable the provision of the control signal as soon as the first and second control conditions are fulfilled.

20. The device according to claim 15, further comprising a difference forming unit configured to form at least one difference signal based on phasor data originating in phasors of the first and second sets and a combining unit configured to combine phasor data originating in phasors of the first set and phasors of the second sets in order to provide said combined signal.

21. The device according to claim 20, wherein the combining unit is configured to provide a weighted average of the phasor data.

22. The device according to claim 20, wherein the combining unit is arranged to combine phasor data from the phasors in the first set for forming a first combined signal and combine phasor data from phasors in the second set for forming a second combined signal, while the difference forming unit is arranged to form a difference signal based on the first and second difference signals, where the control signal is said difference signal.

23. The device according to claim 20, wherein the difference forming unit is configured to form difference signals between the phasors of the first and second sets and the combining unit is configured to combine the difference signals.

24. The device according to claim 20, further comprising a phase adjusting unit configured to adjust the phases of phasor data being combined to a reference phase.

25. The device according to claim 15, further comprising a wide area power oscillations damping unit configured to perform inter-area oscillation damping based on the control signal.

26. A non-transitory machine-readable storage medium comprising a computer program for providing improved control of a power transmission system having a first group of measurement units in a first geographical area and providing a first set of on-line measured phasors and a second group of measurement units in a second geographical area and providing a second set of on-line measured phasors, where the first and the second groups of measurement units each include at least two measurement units and the phasors in the first and second sets are generated at the same instant in time, the computer program being loadable into an internal memory of a power control device and comprises computer program code means to make the power control device, when said program is loaded in said internal memory,
  obtain the first set of phasors from the first group of measurement units and the second set of phasors from the second group of measurement units aligned with each other in time,
  align the first and second sets of phasors with each other in time,
  compare the number of phasors in each set of phasors with a corresponding phasor minimum number threshold,
  determine that a first control condition is fulfilled if each such phasor number threshold has been exceeded, and
  enable the provision of a control signal based on said obtained phasors in the first and second sets if at least said at least said first control condition is fulfilled where this control signal is provided for use in inter-area oscillation damping in relation to the first and the second geographical areas.

* * * * *